(12) United States Patent
Watanabe

(10) Patent No.: US 7,140,411 B2
(45) Date of Patent: Nov. 28, 2006

(54) PNEUMATIC TIRE HAVING INCLINED MAIN GROOVES

(75) Inventor: Susumu Watanabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 41 days.

(21) Appl. No.: 10/489,252

(22) PCT Filed: Nov. 28, 2002

(86) PCT No.: PCT/JP02/12446

§ 371 (c)(1),
(2), (4) Date: Mar. 11, 2004

(87) PCT Pub. No.: WO03/045715

PCT Pub. Date: Jun. 5, 2003

(65) Prior Publication Data

US 2004/0238091 A1    Dec. 2, 2004

(30) Foreign Application Priority Data

Nov. 30, 2001   (JP)   .............................. 2001-366305

(51) Int. Cl.
*B60C 11/03* (2006.01)

(52) U.S. Cl. ............................................... 152/209.28

(58) Field of Classification Search ........... 152/209.18, 152/209.28; D12/549–550, 555–559, 562–565
See application file for complete search history.

(56) References Cited

U.S. PATENT DOCUMENTS

| 4,574,856 | A | * | 3/1986 | Graas ..................... | 152/209.28 |
| 4,641,696 | A | | 2/1987 | Semin et al. | |
| 4,986,324 | A | * | 1/1991 | Suzuki et al. .......... | 152/209.28 |
| D395,625 | S | * | 6/1998 | Mori ......................... | D12/565 |
| 5,954,107 | A | * | 9/1999 | Kuze et al. ............. | 152/209.28 |
| 6,837,285 | B1 | * | 1/2005 | Eromaki ................. | 152/209.28 |

FOREIGN PATENT DOCUMENTS

| EP | 755809 | * | 1/1997 |
| JP | 01-178006 A1 | | 7/1989 |
| JP | 06-191232 A1 | | 7/1994 |
| JP | 10-264612 A1 | | 10/1998 |
| JP | 2000-255217 A1 | | 9/2000 |
| JP | 2001-322406 A1 | | 11/2001 |

OTHER PUBLICATIONS

Machine translation for Japan 2001-322406.*
Machine translation for Japan 2000-255217.*
International Search Report for PCT/JP02/12446 mailed on Mar. 11, 2003.

* cited by examiner

*Primary Examiner*—Steven D. Maki
(74) *Attorney, Agent, or Firm*—Rader, Fishman & Grauer PLLC

(57) ABSTRACT

A pneumatic tire, wherein at least one peripheral main groove (2) is provided in a tread center area and inclined main grooves (3) inclined diagonal-outward in a direction reverse to the specified rotating direction of the tire and reverse inclined main grooves (4) inclined diagonal-outward in a direction reverse to the inclination direction of the inclined main grooves are disposed on both sides of the peripheral main groove alternately in the circumferential direction of the tire, the inner ends of the inclined main grooves (3) are connected midway to the reverse inclined main grooves (4) in the area of 10 to 20% of a contact width from a tire center and the outer ends thereof are extended to shoulders, and the inner ends of the reverse inclined main grooves (4) are connected to the peripheral main groove (2) and the outer ends thereof are connected midway to the inclined main grooves (3).

6 Claims, 2 Drawing Sheets

PNEUMATIC TIRE HAVING INCLINED MAIN GROOVES

TECHNICAL FIELD

The present invention relates to a pneumatic tire and, more specifically, to a pneumatic tire in which wet braking performance and driving stability are improved without reducing hydroplaning resistance.

BACKGROUND ART

To improve the drainage of a pneumatic tire, a tread pattern has been conventionally proposed in which a rotating direction of the tire is specified in one direction (arrow R). As shown in FIG. 2, in the tread pattern, peripheral main grooves 2 are provided in the center area of a tread surface 1, and numerous inclined main grooves 3, inclined diagonal-outward in a direction reverse to the specified rotating direction R of the tire, are provided from the peripheral main grooves 2 to shoulder areas at a predetermined pitch in a circumferential direction of the tire.

However, in this tread pattern, the shape of blocks B each sectioned by two adjacent inclined main grooves 3 and one peripheral main groove 2 is extremely narrowed at treading end portions Q. Accordingly, flexural rigidity is reduced in a width direction of the tire. As a result, there has been a problem that the driving stability is reduced on a dry road. As a measure for preventing this reduction in the driving stability, the blocks are enlarged. Nevertheless, the groove areas of the inclined main grooves are reduced by the amount of the enlargement, thereby causing reduction in the hydroplaning resistance.

Moreover, upon braking on a wet road, water flows from the inclined main grooves toward the peripheral main grooves. Hence, there has been a problem that the braking performance is reduced. As a measure for this reduction, the inclination directions of the inclined main grooves are reversed. However, water in the inclined main grooves flows into the peripheral main grooves upon advancing, and the drainage performance is reduced. This causes a problem that the hydroplaning resistance is reduced.

DISCLOSURE OF THE INVENTION

An object of the present invention is to provide a pneumatic tire in which the wet braking performance and the driving stability are improved without reducing the hydroplaning resistance.

The pneumatic tire of the present invention achieving the foregoing object is characterized in that at least one peripheral main groove is provided in a tread center area and inclined main grooves inclined diagonal-outward in a direction reverse to the specified rotating direction of the tire and reverse inclined main grooves inclined diagonal-outward in a direction reverse to the inclination direction of the inclined main grooves are disposed on both sides of the peripheral main groove alternately in the circumferential direction of the tire, the inner ends of the inclined main grooves are connected midway to the reverse inclined main grooves in the area of 10 to 20% of a contact width from a tire center and the outer ends thereof are extended to shoulders, and the inner ends of the reverse inclined main grooves are connected to the peripheral main groove and the outer ends thereof are connected midway to the inclined main grooves.

As described above, the inclined main grooves and the reverse inclined main grooves are disposed on both sides of the at least one peripheral main groove, which is provided in the tread center area, alternately in the circumferential direction of the tire. Moreover, these three types of main grooves have specific connection relationships. Accordingly, it is possible to widen treading end portions of blocks, which are sectioned by the peripheral main grooves, the inclined main grooves and the reverse inclined main grooves in the tread center area. Thus, the flexural rigidity of the blocks in a width direction of the tire is improved, and the driving stability can be improved.

Furthermore, when the brakes are applied to the tire on a wet road, the reverse inclined main grooves acts on water intending to flow from the inclined main grooves toward the tread center so as to push back the water outward in a width direction of the tread. Consequently, the braking performance is improved. In addition, while advancing, the reverse inclined main grooves split the flow of the water flowing in these reverse inclined main grooves into the inclined main grooves and the peripheral main groove, thereby contributing improvement in the hydroplaning resistance.

BEST MODES FOR CARRYING OUT THE INVENTION

Figure 1:
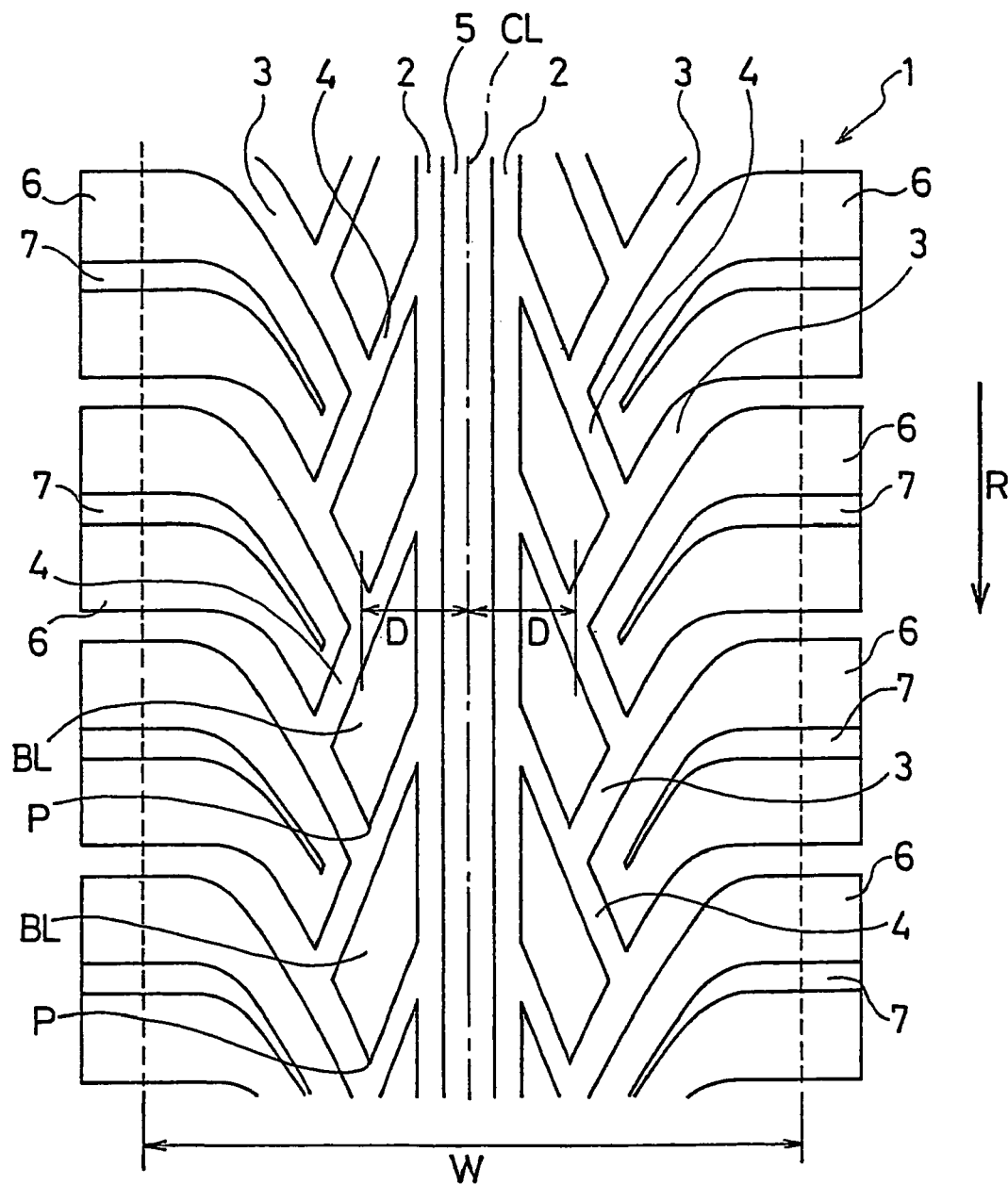
FIG. 1 is a development view showing an example of a tread surface of a pneumatic tire of the present invention.

FIG. 1 is a development view of a tread surface of a pneumatic tire of the present invention.

In the pneumatic tire, a direction of an arrow R is specified as a rotating direction of the tire. In the center area of a tread surface 1, two peripheral main grooves 2, 2 are formed to extend linearly in a circumferential direction of the tire. A rib 5 is formed between the peripheral main grooves 2, 2. Numerous inclined main grooves 3 and reverse inclined main grooves 4 are alternately provided in both outer sides of the two peripheral main grooves 2, 2 at a predetermined pitch in the circumferential direction of the tire.

The inner end of each inclined main groove 3 is connected midway to the reverse inclined main groove 4 in the tread center area. The inclined main groove 3 is inclined in a direction reverse to the specified rotating direction R of the tire and extended to a shoulder. Moreover, the inclined main groove 3 extends further than a shoulder end portion to the outside. By contrast, each reverse inclined main groove 4 is inclined in a direction reverse to the inclined main groove 3 with respect to the circumferential direction of the tire. The inner end of the reverse inclined main groove 4 is connected to the peripheral main groove 2, and the reverse inclined main groove 4 is extended toward the outside of the tread. At the same time, the inner end of the inclined main groove 3 is connected midway to the reverse inclined main groove 4, and the reverse inclined main groove 4 is connected midway to another inclined main groove 3 which is adjacent to the inclined main groove 3.

In the foregoing tread pattern, the inner ends of the inclined main grooves 3 are disposed in positions apart from a tire center CL by a distance D of 10 to 20% of a contact width W. Herein, the position of the inner end of each inclined main groove 3 is determined by the center position of the groove width thereof. In addition, the contact width W of the tread surface 1 is defined by a length in a width direction of the tire based on a contact shape measured when the tire contacts a flat road in a state where the tire is filled and applied with a standard air and load defined by JATMA.

As described above, in the pneumatic tire of the present invention, the inclined main grooves 3 and the reverse inclined main groves 4, which are mutually inclined in reverse directions with respect to the circumferential direction of the tire, are alternately disposed in the circumferential direction of the tire, and the groove ends thereof are disposed to connect midway to the grooves of each other. Thus, in blocks BL each sectioned and formed by two adjacent reverse inclined main grooves 4, one peripheral main groove 2 and one inclined main groove 3, an angle between the inclined main groove 3 and the reverse inclined main groove 4 formed at a treading end portion P on each block BL can be made relatively large. Thus, the flexural rigidity with respect to a width direction of the treading end P is increased, thereby improving the driving stability in corner running.

Moreover, upon braking on a wet road, the reverse inclined main grooves 4 discharge part of water outward in the width direction of the tire. This prevents the concentration of water on the tread center side, thereby improving the wet braking performance.

Furthermore, in advance driving, the foregoing reverse inclined main grooves 4 split and send part of water flowing toward the peripheral main grooves 2, to the inclined main grooves 3. Thus, the drainage is not prevented, and the hydroplaning resistance is not reduced.

As previously mentioned, in the present invention, the inner ends of the inclined main grooves 3 are disposed in the area of 10 to 20% of the contact width W of the tire from the tire center CL. When the inner ends of the inclined main grooves 3 are positioned farther inside than 10% of the contact width W, the blocks BL positioned in the tread center area are reduced. Accordingly, the flexural rigidity is reduced, and the driving stability is reduced. On the other hand, when the inner ends of the inclined main grooves 3 are positioned farther outside than 20% of the contact width W, the length of the inclined main grooves 3 is shortened. Accordingly, the drainage performance is reduced.

In the present invention, two peripheral main grooves 2 are preferably provided on the left and right, interposing the rib 5 therebetween. The drainage in the circumferential direction is further improved, and the rib 5 can improve the driving stability. The peripheral main grooves 2 are preferably straight as in the example shown in the drawing. However, the peripheral main grooves 2 may be zigzagged to a certain extent if the grooves 2 are in a see-through state in the circumferential direction of the tire.

Moreover, in the inclined main grooves 3, it is preferable to set the inclination angle of the inner portions from the inner ends at least to not less than 50% of the entire length to 10° to 40°, and the inclination angle of the remaining outer portions extending to the shoulder portions to 70° to 110°, with respect to the circumferential direction of the tire. If the inclination angle of the inner portions of the inclined main grooves 3 is smaller than 10°, peripheral components of water flowing in the grooves are large. Hence, it is difficult to discharge the water outward in the width direction of the tire. On the other hand, if the inclination angle of the inner portions is larger than 40°, the components in the circumferential direction of the tire become small. Thus, it becomes difficult for the water to move inside the inclined main grooves 3, and thereby it becomes difficult to discharge the water outward in the width direction of the tire. In addition, by setting the inclination angle of the outer portions of the inclined main grooves 3 to approximately 90°, the water can be efficiently discharged outward in the width direction of the tire.

The inclination angle of the reverse inclined main grooves 4 with respect to the circumferential direction of the tire is preferably set to 10° to 40°. If the inclination angle is smaller than 10°, the peripheral components of the water in terms of moving speed are large. Accordingly, it is difficult to discharge water outward in the width direction of the tire upon braking on a wet road. In addition, the flexural rigidity of the blocks, which are sectioned by the peripheral main grooves 2, the inclined main grooves 3 and the reverse inclined main grooves 4, in the width direction of the tire is reduced. Accordingly, the driving stability is reduced. If the inclination angle is larger than 40°, the components in the circumferential direction of the tire become small. Accordingly, it becomes difficult to discharge the water outward in the width direction of the tire upon braking on a wet road surface, thereby reducing the braking performance.

Furthermore, it is preferable to provide at least one auxiliary groove 7 approximately parallel to the inclined main grooves 3 in each block 6 sectioned by the inclined main grooves 3 and the reverse inclined main groove 4 from the tread center area to the tread shoulder area. The auxiliary groove 7 is a one-side open groove in which only the shoulder end is opened, and formed shallower than the inclined main grooves 3. In addition, in order to make the drainage better, the open side is wider than the inner side. By providing the auxiliary grooves 7, it is possible to perform drainage more effectively.

As described above, according to the present invention, the treading end portions of the blocks sectioned by the peripheral main grooves, the inclined main grooves and the reverse inclined main grooves are widened. Thus, the flexural rigidity in the width direction of the tire is improved, thereby improving the driving stability. Upon braking on a wet road, the reverse inclined main grooves push back the water intending to flow from the inclined main grooves to the center area outward in the width direction of the tire. Thus, the wet braking performance can be improved. Moreover, the reverse inclined main grooves split the flow of the water into the inclined main grooves and the peripheral main grooves in advancing. Therefore, the hydroplaning resistance is not reduced substantially.

EXAMPLES

Figure 2:
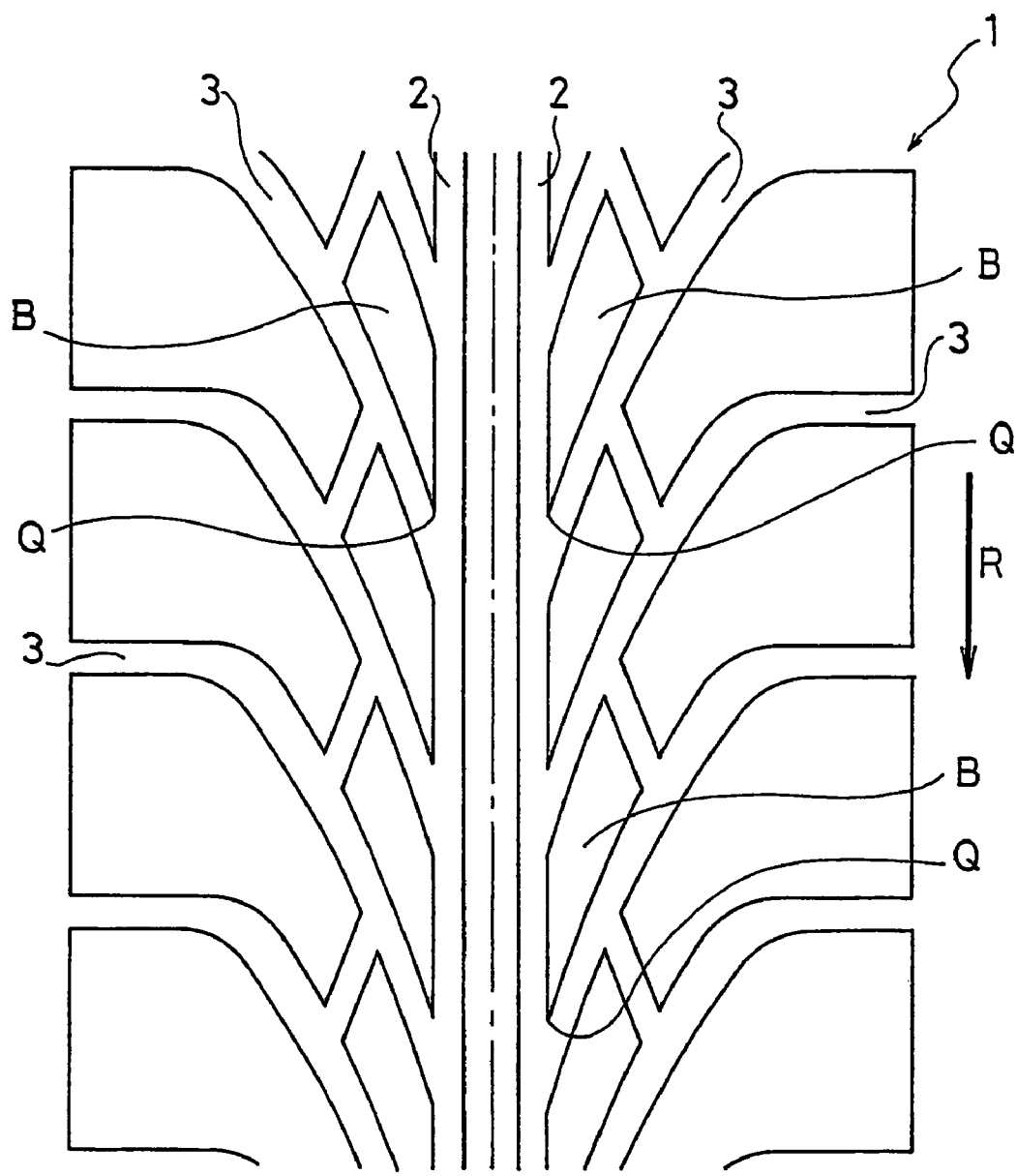
FIG. 2 is a development view showing an example of a tread surface of a conventional pneumatic tire.

Two types of tires were prepared, having the same tire size of 225/50R16 92V and different tread patterns. The pneumatic tire (Example) has the tread pattern in FIG. 1, in which only the auxiliary grooves are omitted. The pneumatic tire (Comparison Example) has the tread pattern in FIG. 2. Both tires have the same groove width, groove depth and alignment pitch of the peripheral main grooves, inclined main grooves and reverse inclined main grooves.

The foregoing two types of pneumatic tires were fit to respective test vehicles. The hydroplaning resistance, the braking performance on a wet road surface (wet braking performance) and the driving stability on a dry road surface were measured by the undermentioned measurement methods. The results are listed in Table 1.

[Hydroplaning Resistance]

The speeds were measured when the first hydroplaning occurred while driving on a wet road with a water film of 10 mm and increasing the driving speed gradually. The evaluations are indicated by indices, where the measured value of the tire of Comparison Example was set to 100. Larger index values indicate better hydroplaning resistance.

[Wet Braking Performance]

The distances were measured from the point where the brakes were suddenly applied to the point where the vehicle fully stopped when entering the wet road with a water film of 10 mm at a speed of 100 km/h. The evaluations were performed with the reciprocals of the measured values and indicated by indices, where the reciprocal of the measured value of the tire of Comparison Example was set to 100. Larger index values indicate better wet braking performance.

[Driving Stability]

Three test drivers evaluated, using a 5-point grading system, the feeling of the steering performance when changing lanes while driving straight on a highway at a speed of 120 km/h. The evaluation points of the three test drivers were added to produce average values, which are indicated by indices, where the average evaluation point of the tire of Comparison Example was set to 100. Larger index values indicate better driving stability.

TABLE 1

|  | Example | Comparison Example |
| --- | --- | --- |
| Hydroplaning Resistance (Index) | 98 | 100 |
| Wet Braking Performance (Index) | 105 | 100 |
| Driving Stability (Index) | 110 | 100 |

From Table 1, the tire of Example (present invention) improves the wet braking performance and the driving stability while maintaining the hydroplaning resistance substantially at the same level as the tire of Comparison Example (conventional example).

INDUSTRIAL APPLICABILITY

The present invention can be utilized in a pneumatic tire for any of vehicles for passengers and for heavy-loads such as trucks and buses. Especially, the present invention is effective for pneumatic radial tires. Furthermore, the present invention is suitable for a pneumatic radial tire for passenger vehicles.

What is claimed is:

1. A pneumatic tire, wherein:
   at least one peripheral main groove is provided in a tread center area,
   inclined main grooves inclined diagonal-outward in a direction reverse to a specified rotating direction of the tire and reverse inclined main grooves inclined diagonal-outward in a direction reverse to an inclination direction of the inclined main grooves are disposed on both sides of the peripheral main groove alternately in a circumferential direction of the tire,
   inner ends of the inclined main grooves are connected midway to the reverse inclined main grooves in an area of 10 to 20% of a contact width from a tire center and outer ends thereof are extended to shoulders, and
   inner ends of the reverse inclined main grooves are connected to the peripheral main groove and outer ends thereof are connected midway to the inclined main grooves.

2. The pneumatic tire according to claim 1, wherein angles of the inclined main grooves with respect to the circumferential direction of the tire are set to 10° to 40° for inner portions from the inner ends thereof to at least 50% of a length thereof, and to 70° to 110° for outer sides from the inner portions.

3. The pneumatic tire according to claim 2, wherein an angle of the reverse inclined main grooves with respect to the circumferential direction of the tire is set to 10° to 40°.

4. The pneumatic tire according to claim 1, wherein at least one auxiliary groove substantially parallel to the inclined main grooves is provided in a block sectioned by two of the adjacent inclined main grooves and one of the reverse inclined main grooves.

5. The pneumatic tire according to claim 2, wherein at least one auxiliary groove substantially parallel to the inclined main grooves is provided in a block sectioned by two of the adjacent inclined main grooves and one of the reverse inclined main grooves.

6. The pneumatic tire according to claim 3, wherein at least one auxiliary groove substantially parallel to the inclined main grooves is provided for a block sectioned by two of the adjacent inclined main grooves and one of the reverse inclined main grooves.

* * * * *